United States Patent
Kazemi et al.

(10) Patent No.: US 10,121,374 B2
(45) Date of Patent: Nov. 6, 2018

(54) PARKING EVENT DETECTION AND LOCATION ESTIMATION

(71) Applicant: Apple Inc., Cupertino, CA (US)

(72) Inventors: Pejman Lotfali Kazemi, Sunnyvale, CA (US); Lili Cao, Sunnyvale, CA (US); Sunny Kai Pang Chow, San Jose, CA (US); Gunes Dervisoglu, Santa Clara, CA (US); Anh Phan, Milpitas, CA (US); Ryan David Shelby, Los Gatos, CA (US); Ronald K. Huang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/273,533

(22) Filed: Sep. 22, 2016

(65) Prior Publication Data
US 2017/0358208 A1    Dec. 14, 2017

Related U.S. Application Data

(60) Provisional application No. 62/348,807, filed on Jun. 10, 2016.

(51) Int. Cl.
  G08G 1/123    (2006.01)
  G08G 1/14     (2006.01)
  H04W 4/04     (2009.01)

(52) U.S. Cl.
  CPC ............ *G08G 1/123* (2013.01); *G08G 1/144* (2013.01); *H04W 4/046* (2013.01)

(58) Field of Classification Search
  CPC ........ G08G 1/123; G08G 1/124; G08G 1/144; H04W 4/046
  See application file for complete search history.

(56) References Cited

U.S. PATENT DOCUMENTS

| 5,416,712 A | 5/1995 | Geier et al. |
| 6,405,125 B1 | 6/2002 | Ayed |

(Continued)

FOREIGN PATENT DOCUMENTS

| EP | 2474943 A1 | 7/2012 |
| EP | 1 332 336 B1 | 10/2012 |

OTHER PUBLICATIONS

"Automatically Recognizing Places of Interest from Unreliable GPS Data Using Spatio-Temporal Density Estimation and Line Intersections," Bhattacharya, Kuliki, and Bailey; Department of Computing and Information Systems, The University of Melbourne, Parkville, Australia, Available online Aug. 16, 2014 Pervasive and Mobile Computing.*

(Continued)

*Primary Examiner* — Brian Zimmerman
*Assistant Examiner* — Sara Samson
(74) *Attorney, Agent, or Firm* — Fish & Richardson P.C.

(57) ABSTRACT

Systems, methods, devices and computer-readable mediums are disclosed for parking event detection and location estimation. In some implementations, a method comprises: determining, by a processor of a mobile device, a first activity state indicative of a possible parking event; obtaining, by the processor, a speed of the mobile device from a global navigation satellite system (GNSS) of the mobile device; obtaining, by the processor, pedometer data from a digital pedometer of the mobile device; determining, by the processor, a second activity state indicative of a possible parking event based at least in part on the GNSS speed and pedometer data; and responsive to the second activity state, estimating, by the processor, a location of the vehicle.

19 Claims, 10 Drawing Sheets

(56) References Cited

U.S. PATENT DOCUMENTS

| | | | |
|---|---|---|---|
| 6,407,698 B1 | 6/2002 | Ayed | |
| 6,429,791 B2 | 8/2002 | Quinn | |
| 6,909,964 B2 | 6/2005 | Armstrong et al. | |
| 6,982,669 B2 | 1/2006 | Coatantiec et al. | |
| 7,369,061 B1 | 5/2008 | Sellers et al. | |
| 7,688,226 B2 | 3/2010 | McCall | |
| 7,847,709 B2 | 12/2010 | McCall et al. | |
| 8,112,251 B2 | 2/2012 | Case, Jr. et al. | |
| 8,498,805 B2* | 7/2013 | Joong | G01C 21/3605 382/103 |
| 8,676,231 B2 | 3/2014 | MacDonald | |
| 8,976,063 B1 | 3/2015 | Hawkins et al. | |
| 9,080,878 B2 | 7/2015 | Skinder et al. | |
| 9,606,241 B2 | 3/2017 | Varoglu | |
| 2006/0111835 A1 | 5/2006 | Baker et al. | |
| 2006/0208568 A1 | 9/2006 | Kaita et al. | |
| 2006/0267799 A1 | 11/2006 | Mendelson | |
| 2007/0126603 A1 | 6/2007 | Driscoll et al. | |
| 2009/0091477 A1 | 4/2009 | McCall et al. | |
| 2009/0112517 A1* | 4/2009 | Hsyu | G01S 5/021 702/181 |
| 2009/0177385 A1* | 7/2009 | Matas | G01C 21/3614 701/533 |
| 2009/0309759 A1* | 12/2009 | Williams | G08G 1/14 340/932.2 |
| 2009/0315767 A1 | 12/2009 | Scalisi et al. | |
| 2010/0238070 A1* | 9/2010 | Harper | H04W 36/385 342/357.46 |
| 2010/0318293 A1 | 12/2010 | Brush et al. | |
| 2011/0032105 A1 | 2/2011 | Hoffman et al. | |
| 2011/0093583 A1 | 4/2011 | Piemonte et al. | |
| 2011/0239026 A1 | 9/2011 | Kulik | |
| 2011/0307171 A1 | 12/2011 | Waite | |
| 2012/0176255 A1 | 7/2012 | Choi et al. | |
| 2012/0197588 A1 | 8/2012 | Lee et al. | |
| 2013/0096817 A1 | 4/2013 | Fauci et al. | |
| 2013/0099892 A1 | 4/2013 | Tucker et al. | |
| 2013/0103200 A1 | 4/2013 | Tucker et al. | |
| 2013/0184002 A1 | 7/2013 | Moshfeghi | |
| 2013/0245986 A1* | 9/2013 | Grokop | H04M 1/72569 702/141 |
| 2013/0249733 A1* | 9/2013 | MacGougan | G01S 19/47 342/357.23 |
| 2013/0297198 A1 | 11/2013 | Vande Velde et al. | |
| 2014/0028477 A1 | 1/2014 | Michalske | |
| 2014/0066091 A1 | 3/2014 | Varoglu et al. | |
| 2014/0136103 A1 | 5/2014 | Korn et al. | |
| 2014/0232570 A1* | 8/2014 | Skinder | G01C 21/165 340/989 |
| 2015/0029041 A1 | 1/2015 | Liu et al. | |
| 2016/0068158 A1 | 3/2016 | Elwart et al. | |
| 2016/0242008 A1 | 8/2016 | Tu et al. | |

OTHER PUBLICATIONS

'Support.Google.com' [online]. "Parking location in Google Now," posted on or before May 1, 2014, [retrieved on Apr. 28, 2016]. Retrieved from the Internet: URL<https://support.google.com/websearch/answer/6015842?hl=en>. 2 pages.

Kwapisz, Jennifer R., et al., "Activity Recognition Using Cell Phone Accelerometers," SensorKDD '10, Jul. 25, 2010, Washington, D.C., USA, 9 pages.

International Search Report and Written Opinion for International PCT Application No. PCT/US2014/012667, dated Apr. 22, 2014, 8 pages.

International Search Report and Written Opinion for International PCT Application No. PCT/US2014/012669, dated Apr. 22, 2014, 8 pages.

Non-Final Office Action for U.S. Appl. No. 13/773,546, dated Jul. 25, 2014, 11 pages.

Final Office Action for U.S. Appl. No. 13/773,481, dated Dec. 1, 2014, 10 pages.

Non-Final Office Action for U.S. Appl. No. 13/773,481, dated Aug. 12, 2014, 10 pages.

* cited by examiner

PARKING EVENT DETECTION AND LOCATION ESTIMATION

CROSS-REFERENCE TO RELATED APPLICATION

This application claims priority to U.S. Provisional Patent Application No. 62/348,807, filed Jun. 10, 2016, the entire contents of which are incorporated herein by reference.

TECHNICAL FIELD

This disclosure relates generally to vehicle parking applications for mobile devices.

BACKGROUND

A common frustration among commuters is forgetting where they parked their car. This can occur in large parking lots where the commuter may be unfamiliar with the parking layout or if the commuter is in a hurry and does not note where she parked her car. The conventional solution is for the commuter to jot down her parking location on paper. This solution assumes the commuter has a pencil and paper handy and remembers to jot down her parking location. Even if the commuter creates such a note it is quite common for a commuter to misplace the paper. If the commuter has a mobile device, the commuter may have a parking application installed that allows the commuter to store her parking location. Such parking applications, however, have to be downloaded by the commuter on a mobile device and the commuter has to remember to invoke the application and manually store her parking location before leaving her parked car.

SUMMARY

Systems, methods, devices and computer-readable storage mediums are disclosed for parking event detection and location estimation.

In some implementations, a method comprises: determining, by a processor of a mobile device, a first activity state indicative of a possible parking event; obtaining, by the processor, a speed of the mobile device from a global navigation satellite system (GNSS) of the mobile device; obtaining, by the processor, pedometer data from a digital pedometer of the mobile device; determining, by the processor, a second activity state indicative of a possible parking event based at least in part on the GNSS speed and pedometer data; and responsive to the second activity state, estimating, by the processor, a location of the vehicle.

Particular implementations disclosed herein provide one or more of the following advantages. When a user's vehicle is parked, an estimate of the parking location is automatically and transparently estimated and stored on the user's mobile device. One or more GUIs are provided that allows the user to confirm and/or edit the estimated parking location and to augment the estimated location with other information such as a digital image. When the user is ready to return to her vehicle, turn-by-turn visual and/or audio directions from the user's current location are provided to the user through their mobile device.

The details of the disclosed implementations are set forth in the accompanying drawings and the description below. Other features, objects and advantages are apparent from the description, drawings and claims.

DESCRIPTION OF DRAWINGS

The same reference symbol used in various drawings indicates like elements.

DETAILED DESCRIPTION

Example System

Figure 1:
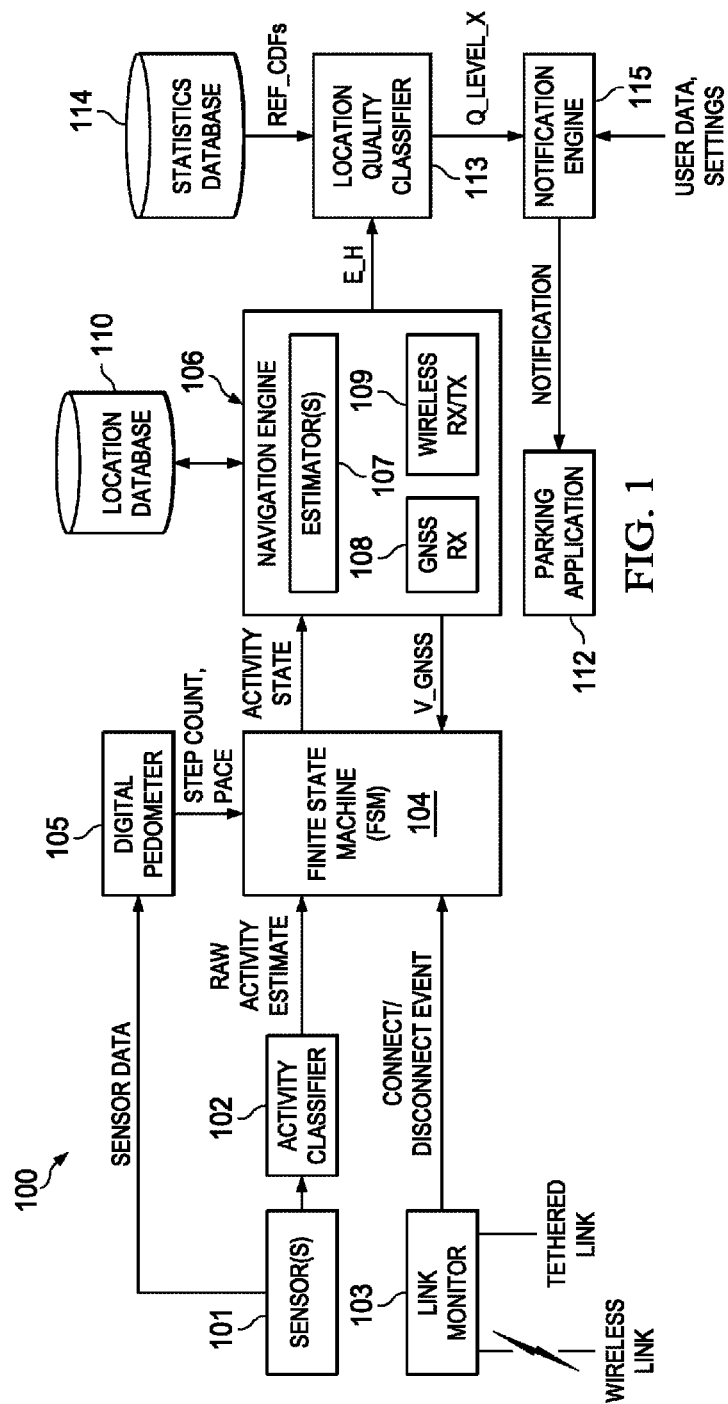
FIG. 1 is a block diagram of an example system for parking event detection and location estimation, according to an embodiment.

FIG. 1 is a block diagram of an example system 100 for parking event detection and location estimation, according to an embodiment. System 100 can include sensor(s) 101, activity classifier 102, link monitor 103, FSM 104, digital pedometer 105, navigation engine 106, location database 110, parking application 112, location quality classifier 113, statistical database 114 and notification engine 115. Navigation engine 106 further includes estimator(s) 107, GNSS receiver (RX) 108 and wireless transceiver (RX/TX) 109. The various components of system 100 can be implemented entirely or partially in software or hardware. System 100 can be included in any mobile device, including but not limited to: a smartphone, tablet computer, notebook computer and wearable computer (e.g., smart watch, smart glasses).

In an example use case, a user is driving her car to a destination. She has a mobile device (e.g., a smartphone) in her possession, which she keeps in a cradle on her dashboard when driving. Her mobile device is paired with her car's operating system or multimedia system using Bluetooth. When she arrives at her destination she finds a parking space and parks her car. She exits the vehicle and begins to walk in a direction away from the car carrying or wearing her mobile device. As she walks away from her car she receives a notification on the display of her mobile device providing the estimated location of her parked car, which was automatically and transparently determined by a parking application on her mobile device. The notification also provides her with an option to open a maps application on her smartphone to confirm the estimated parking location.

The example use case described above is facilitated by system 100. In an embodiment, link monitor 103 is configured to monitor a communication connection (e.g., a Bluetooth connection or wired connection) with a vehicle's wireless network (e.g., the vehicle's operating system or multimedia system) or docking station, and output a connect or disconnect event to FSM 104 based on the monitoring. For example, link monitor 103 can monitor one or more of calculated distance, received signal strength, signal-to-noise ratio (SNR), frame error rate, transmission power, and any other parameter, signal or metric that can indicate that the mobile device is connected or disconnected from the vehicle. In some embodiments where the mobile device is tethered to the car's operating system or multimedia system or other hardware device using a cable or placed in a cradle or docking station fixed to the vehicle, a connect event signal can be generated. When the user disconnects the cable or removes the mobile device from the docking station, a disconnect event signal can be generated.

FSM 104 receives the connect or disconnect event signal and a raw activity estimate from activity classifier 102. In an embodiment, activity classifier 102 obtains sensor data (e.g., acceleration data) from sensors 101 (e.g., accelerometers) and outputs the raw activity estimate based on the sensor data. Some examples of raw activity estimates include but are not limited to: STATIC (user is likely not moving), MOVING (user is likely moving), PEDESTRIAN (user is likely walking or running) and VEHICULAR (user is likely in a moving vehicle). Activity classifier 102 can use any suitable classifier to generate the raw activity estimate (e.g., a Bayesian Hidden Markov Model (HMM)). In some embodiments, other raw activity estimates can be provided by activity classifier 102 (e.g., cycling, swimming). Based on a connect/disconnect event and raw activity estimate, FSM 104 generates an activity state, which is sent to navigation engine 106.

Figure 2:
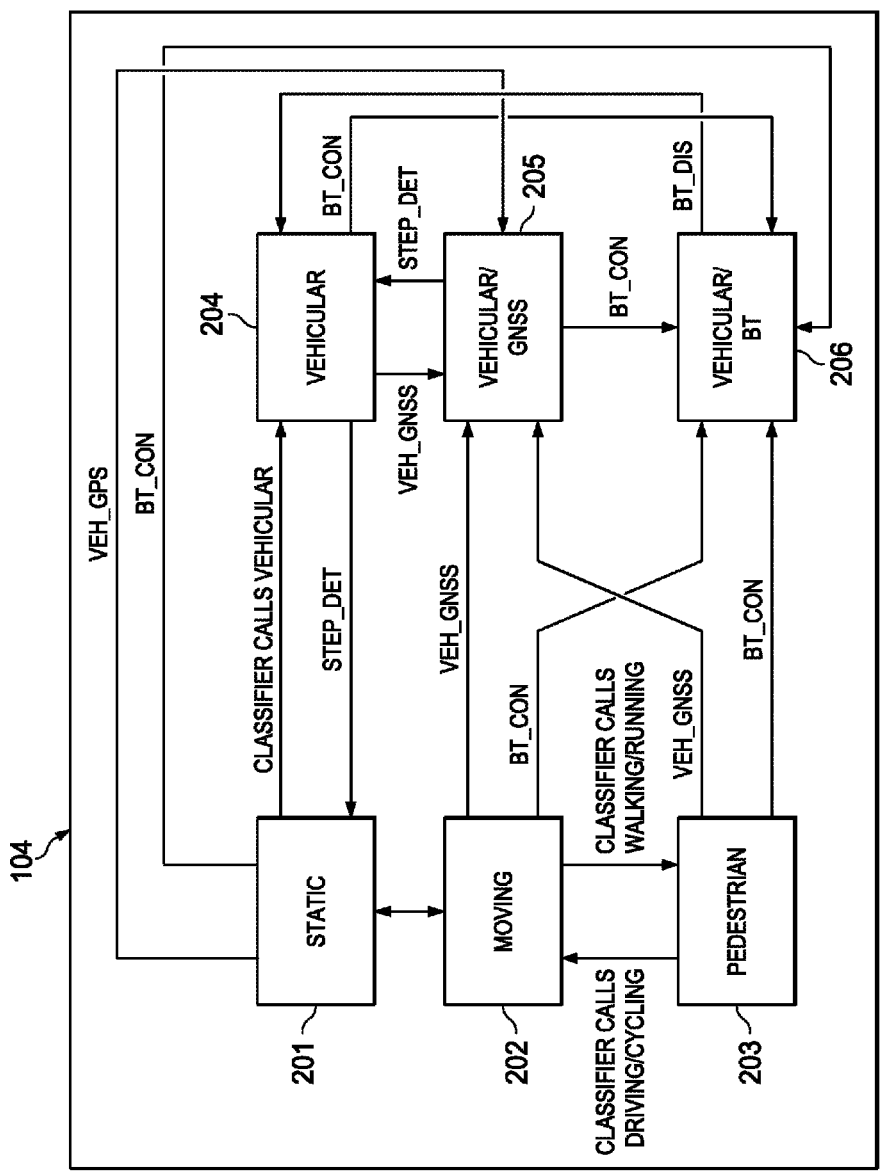
FIG. 2 is a block diagram of the example finite state machine (FSM) shown in FIG. 1, according to an embodiment.

In an embodiment, the activity state is used by navigation system 106 to indicate a possible vehicle parking event and confidence levels associated with the possible parking event, as described in reference to FIG. 2. In an embodiment, a first confidence level is a low confidence level. If navigation engine 106 determines a first confidence level (low confidence that a parking event occurred), navigation engine 106 obtains GNSS data from GNSS RX 108 for a period of time (e.g., 15 seconds). The GNSS data (e.g., position, velocity, horizontal uncertainty, timestamp) is stored in a buffer for use by one or more estimator(s) 107 to compute an estimated vehicle parking location. Similarly, navigation engine 106 obtains Wi-Fi location data from wireless AP signals that are picked up in a wireless network scan ("Wi-Fi scan") by wireless transceiver RX/TX 109. The Wi-Fi location data is stored in the buffer for use by one or more estimator(s) 107 to estimate the vehicle parking location if GNSS data is unavailable or the buffered GNSS data has a substantially larger horizontal uncertainty than the buffered Wi-Fi location data.

In an embodiment, there can be two types of Wi-Fi location data. One type is indoor Wi-Fi location data, which is derived from surveying venues and fingerprinting and the other Wi-Fi location data is obtained from Wi-Fi scans of wireless access point (AP) signals. The indoor Wi-Fi location data can be mixed with GNSS data in the same buffer. The Wi-Fi scan location data, however, could be biased depending on the geometry of the APs. For example, the Wi-Fi scan may obtain many APs, which can result in a small horizontal uncertainty. However, since all of the APs are inside a building the location estimate may be biased toward the building. Because of this bias, the location data obtained from a Wi-Fi scan can be stored in a separate buffer.

The GNSS speed (V_GNSS) is sent to FSM 104 where it is used together with the raw activity estimate from activity classifier 102 and pedometer data (e.g., step count, pace) from digital pedometer 105 to determine a new activity state of the mobile device, which is sent to navigation engine 106. Note that pace can be used in conjunction with step count to ensure that the user is in fact walking. For example, if the user is holding the mobile device display side up then the accelerometers may not count steps correctly even though the user is walking.

Based on a new activity state received from FSM 104, navigation engine 106 may reset or maintain the first confidence level or determine a second confidence level that is higher than the first confidence level. The second confidence level is higher than the first confidence level because the pedometer data indicates that the user is walking, which when combined with a disconnect event, is consistent with the user exiting their vehicle during a parking event. Responsive to the second confidence level, estimator(s) 107 estimate the vehicle parking location car and a corresponding horizontal position uncertainty of the estimate. In an embodiment, the horizontal position uncertainty (E_H) is determined in a geodetic or local level reference coordinate frame, such as East North Up (ENU), as described in further detail below.

Estimator(s) 107 can include one or more filters that operate on the buffer of GNSS data and indoor location data. In an embodiment, a fixed-point smoother is used to estimate the vehicle location based on the buffer of GNSS and indoor locations. These locations are collected in the buffer before and after the communication link disconnect event time, which is hereinafter referred to as time j. Locations before time j are collected opportunistically, meaning that if locations are being obtained for other applications on the mobile device then those locations will be used in the parking location estimation. Leveraging location estimates for other applications can reduce power consumption on the mobile device. After the disconnect event time j, navigation engine 106 will request locations for a specific amount of time (e.g., 15 seconds) and add those locations to the buffer. Using the buffer of locations an estimate of the parked vehicle at a time j can be obtained, as described below.

We will use the notation $x_{j,k}$ to refer to the estimate of $x_j$ that is obtained by using all of the measurements in the buffer up to and including time k−1. As the location samples around the parking time are correlated with low speed we model our system as a random walk. Note x is a two or three dimensional vector of EN or ENU. A Kalman filter up until time j can be run at which point we have $x_j^-$ and the covariance $P_j$, where $P_j$ is the normal a priori covariance of the estimate of $x_j$. The equations of the Kalman filter are well-known and not repeated here. However, for samples after the time j we initialize the filter as follows:

$$\Sigma_j = P_j$$

$$\Pi_j = P_j$$

$$x_{j,j} = x_j^-,$$

where $\Pi_k$ is the covariance of the smoothed estimate of $x_j$ at time k, and $\Sigma_k$ is the cross covariance between $\Pi_k$ and $P_k$. For samples k=j, j+1, . . . , considering a random walk model we perform the following:

$$L_k = P_k(P_k + R_k)^{-1}$$

$$\lambda_k = \Sigma_k(P_k + R_k)^{-1}$$

$$x_{j,k+1} = x_{j,k} + \lambda_k(y_k - x_k^-)$$

$$x_{k+1}^- = x_k^- + L_k(y_k - x_k^-)$$

$$P_{k+1} = P_k(I-L_k)^T + Q_k$$

$$\Pi_{k+1} = \Pi_k - \Sigma_k \lambda_k^T$$

$$\Sigma_{k+1} = \Sigma_k(I-L_k)^T,$$

where $R_k$ is covariance matrix of measurement noise and is derived from horizontal uncertainty of each raw location in the buffer, $Q_k$ is covariance matrix of process noise, $y_k$ is the measurement at time k which is the same as raw location in input buffer, I is an Identity matrix and operator T is matrix transpose. More sophisticated models instead of random walk can also be considered but the principal remains the same. As mentioned before, $\Pi_k$ is the covariance of the smoothed estimate of $x_j$ and will be provided as a horizontal uncertainty (E_H) of the estimate vehicle location $x_j$.

In some embodiments, the activity state provided by FSM 104 can be used to tune various parameters of the estimator(s) 107. For example, if an extended Kalman filter is used to estimate the parking location from GNSS data, the process noise can be tuned by selecting (e.g., from a look-up table) and/or calculating a different process noise value (e.g., a different process noise variance) based on the activity state.

In an embodiment, for each buffered GNSS and Wi-Fi location data point, a time difference can be calculated between the time of the parking event (e.g., the time of disconnect event) and the timestamp of the estimated location provided by estimator(s) 107. The time difference multiplied by an average walking speed gives an additional horizontal position uncertainty that can be added to the estimated horizontal position uncertainty generated by estimator(s) 107. Navigation engine 106 can select as the estimated parking location one of a GNSS estimated location or a Wi-Fi estimated location that has the lowest modified horizontal position uncertainty.

In an embodiment, the estimated location and modified horizontal position uncertainty can be provided to location quality classifier 113. Location quality classifier 113 can generate a histogram of horizontal position uncertainties collected over a time period to provide an approximation of a probability distribution function (PDF) of horizontal position uncertainties over the time period. A cumulative distribution function (CDF) can be computed from the PDF and compared against reference CDFs (REF_CDFS) to generate a location quality level (Q_Level_X). Each reference CDF can represent a distribution of horizontal position uncertainties having an associated location quality level. The reference CDFs can be computed over a large number of signal conditions, such as outdoor environments, indoor environments, dense multipath environments, etc. The location quality level may be a percentage between 0% to 100% or an integer value, such as "1," "2," and "3," and/or a discrete qualitative value or label, such as "poor," "neutral," and "good." In an embodiment, there can be two classification levels: "good" and "poor."

The reference CDF that most resembles the computed CDF based on statistical measurements is selected for determining the quality level for the estimated parking location. In an embodiment, the comparisons are made using a least squares formulation on a vector of points defining the computed CDF and a vector of points defining each reference CDF. The location quality level of closest matching reference CDF based on the smallest least squared error is selected as the location quality level for the estimated parking location.

The location quality level is sent to notification engine 115, which is configured to send notifications to parking application 112 based on the location quality level. An example parking application 112 is described with reference to FIGS. 4-9. For example, if the location quality level is "good," then notification engine 115 will provide the location to the user via a display or audio output device. The language used in the notification can be adjusted based on the location quality level, such as using the phrase "located near" to describe the parking location if the location quality level is not high and/or to take into account that activity classifier 102 output can have some level of uncertainty as well. In some use cases, if the location quality level is "poor," parking application 112 displays a GUI that does not include the estimated vehicle parking location and invites the user to confirm and edit the estimated parking location in a separate editing GUI, as described in reference to FIGS. 8-10.

In an embodiment, if the estimated vehicle parking location is a known designated parking space associated with the user (e.g., a reserved parking space at home or work), a notification will not be provided. For example, navigation engine 106 can keep a history of parking events in database 110 collected over a period of time. If a pattern is discovered (e.g., a frequency pattern) that the user repeatedly parks at the same general location during, for example, a work week at a specific time or time range (e.g., Monday through Friday from 9:00 AM to 5:00 PM), then that location may be labeled as the user's known designated parking location at work. In some embodiments, the user can input information regarding designated parking locations into the parking application or that information can be included in a contact page or address book stored on the mobile device or accessible via a network server.

FIG. 2 is a block diagram of the example FSM 104 shown in FIG. 1, according to an embodiment. In the example shown, FSM 104 has six activity states: STATIC 201, MOVING 202, PEDESTRIAN 203, VEHICULAR 204, VEHICULAR/GNSS 205 and VEHICULAR/BT 206. The lines connecting the blocks representing the activity states represent activity state transitions. The labels above the connecting lines represent the input signals that cause the activity state to transition. At any point in time, one of activity states 202-206 are output by FSM 104.

In a first example use case, if in MOVING 202 and a Bluetooth connection (BT_CON) is detected, MOVING 202 transitions to VEHICULAR/BT 206, which activity state indicates that the mobile device (and presumably the user) is in a vehicle and connected to the vehicle operating system or multimedia system or wireless network through a Bluetooth connection (e.g., connected to the vehicle's operating system or multimedia system). If a Bluetooth disconnect event is detected (BT_DIS), VEHICULAR/BT 206 transitions to VEHICULAR 204, which activity state indicates that the mobile device is in a vehicle but not connected to the vehicle through a Bluetooth connection. The transition to VEHICULAR 204 is interpreted by navigation engine 106 as a possible parking event with a low confidence level. The confidence level is low because the driver could have intentionally or unintentionally disconnected their mobile device from the Vehicle while driving.

In an embodiment, the transition from VEHICULAR 204 to MOVING 202 and from MOVING 202 to PEDESTRIAN 203 is interpreted by navigation engine 106 as a possible parking event with a high confidence level. The transition from VEHICULAR 204 to MOVING 202 is based on a likelihood that the user is walking and the transition from MOVING 202 to PEDESTRIAN 203 is based on the continued likelihood that the user is walking or running. The likelihood can be determined by activity classifier 102 (e.g., a Bayesian HMM). The confidence level is high because the Bluetooth connection was disconnected when the user was in their vehicle and the user is now walking, which strongly suggests that the user has exited their vehicle after parking.

In another example use case, the mobile device transitions from MOVING 202 to VEHICULAR/GNSS 205 in response to the GNSS speed (VEH_GNSS) being detected above a threshold level or average level. If a Bluetooth connect event is detected (BT_CON), then VEHICULAR/GNSS 205 transitions to VEHICULAR/BT 206, which indicates that the user is driving or a passenger in the vehicle has their mobile device connected to the vehicle's wireless AP. The mobile device remains VEHICULAR/BT 206 until a Bluetooth disconnect event is detected, in which case the activity state transitions to VEHICULAR 204. This transition is interpreted by navigation engine 106 as a possible parking event with a low confidence level. However, if steps are detected, VEHICULAR 204 transitions to STATIC 201, which transition is interpreted by navigation engine 106 as a possible parking event with a high confidence level for the reasons described in the previous example use case.

In yet another example use case, the activity state of the mobile device is VEHICULAR/GNSS 205 because the GNSS speed exceeds an absolute or average threshold speed indicating that the driver is in a moving vehicle. In this use case, the driver did not connect their mobile device to the vehicle access point. The activity state will continue in VEHICLE/GNSS 205 until steps are detected from the pedometer data, after which the activity state transitions to STATIC 201. Other example transitions are shown in FIG. 2. For example, in an embodiment the transition from MOVING 202 to VEHICULAR 204 is based on a running sum of a difference of likelihoods of activity classes representing ambiguous movement and vehicular movement that are output by activity classifier 102 and stored in a buffer. When the running sum exceeds an empirically established threshold, MOVING 202 transitions to VEHICULAR 204.

In an embodiment, the parking event can be learned from user speech received by an intelligent personal assistant or knowledge navigator. For example, a user could speak the phrase: "I'm parked near Guerrero St," and a speech recognition engine embedded in the mobile device can interpret the speech as related to a parking event. The street address can be parsed from the speech and sent directly to notification engine 115 where it can be sent in a notification to parking application 112. The speech recognition engine can be trained to recognize speech related to parking events and use that speech to trigger the sending of parking event information (e.g., a street address) to notification engine 115.

Example Processes

Figure 3:
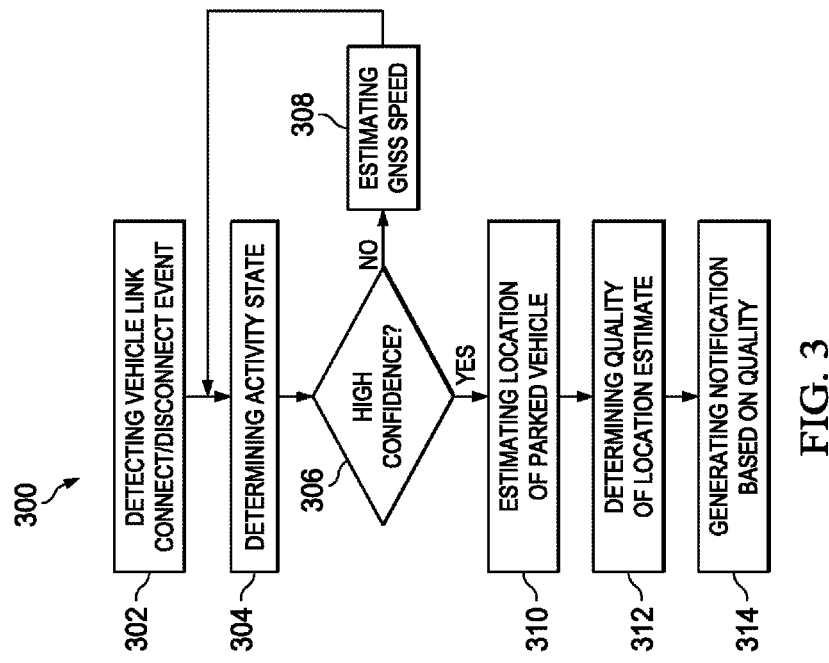
FIG. 3 is a flow diagram of an example process for parking event detection and location estimation, according to an embodiment.

FIG. 3 is a flow diagram of an example process 300 for parking detection and location estimation, according to an embodiment. Process 300 can be implemented using, for example, device architecture 1000 described in reference to FIG. 10.

In an embodiment, process 300 can begin by detecting, by a mobile device, a connection or disconnection of a wired or wireless communication link between the mobile device and a vehicle (302). For example, the mobile device (e.g., a smartphone, wearable device) can be paired with a vehicle operating system or multimedia system using, for example, Bluetooth technology. When the Bluetooth link is connected or disconnected, a connect or disconnect event is generated. The event can be represented by, for example, a Boolean value, a bit/word or any other data that can provide at least a binary value to indicate connection and disconnection.

Process 300 can continue by determining an activity state of the mobile device (304). For example, an activity classifier can provide a raw activity estimate of an activity class, such as STATIC, MOVING, PEDESTRIAN and VEHICLE to an FSM, which uses additional sensor data and a connect event or disconnect event to provide an activity state of the mobile device. Based on the activity state, a navigation engine (e.g., navigation engine 106) in the mobile device determines (306) that a possible parking event has occurred with a low confidence level. Process 300 can then obtain the GNSS speed of the mobile device. The GNSS speed and other data (e.g., digital pedometer data) is used to determine a new activity state (304). The digital pedometer data can include a step count and/or a pace that can be used to determine if the user is running or walking. In some implementations, other sensor data can be used in place of or in combination with digital pedometer data to determine an activity state of the mobile device, including but not limited to: wireless network data, acceleration data, orientation data (e.g., gyro sensor data), barometric pressure, ambient light, ambient noise, magnetic fields, etc. For example, if the mobile device is paired with a vehicle's wireless network access point (AP) (e.g., a Wi-Fi connection), then a received signal strength indicator (RSSI) or other signal characteristic can be monitored on the mobile device to determine if the user has exited the vehicle and/or is moving in a direction away from the vehicle.

Based on the new activity state, process 300 can determine (306) that a possible parking event has occurred with a high confidence level, as described in reference to FIG. 3. Responsive to the determination, process 300 can estimate the location of the parked vehicle (310). The location can be estimated using, for example, a buffer of GNSS data and indoor Wi-Fi location data and a fixed-point smoothing filter (e.g., a Kalman smoother). In addition to the estimated parking location, a horizontal position uncertainty of the parking location estimate is determined. If process 300 determines (306) that a possible parking event has not occurred with a high confidence level, GNSS speed is estimated (308) and process 300 returns to step (304).

Process 300 can continue by determining a quality level for the parking location estimate (312). For example, a CDF of the buffered horizontal position uncertainties can be compared to reference CDFs trained using signals from various signal environments (e.g., dense urban environments). Each reference CDF can be associated with a quality level. The quality level associated with the closest matching reference CDF to the computed CDF in a statistical sense is the quality level for the estimated parking location. In an embodiment, a least squares formulation can be applied to a vector of computed CDF points and vectors of reference CDF points to determine the closest match as the reference CDF vector that minimizes the least squares error.

Process 300 can continue by generating a notification associated with the parking event and estimated location based on the quality level (314). For example, if the quality level is "good" then the notification can include the estimated parking location. If the quality level is "poor" then the notification may not include the estimated parking location, or can include the estimated parking location but also instruct the user to confirm the location using a location editor, such as described in reference to FIGS. 7A and 7B. In an embodiment, an example of "good" quality level could represent a horizontal position uncertainty of less than 15 meters and "poor" quality level can represent a horizontal position uncertainty of greater than 15 meters.

Example Graphical User Interfaces

Figure 4:
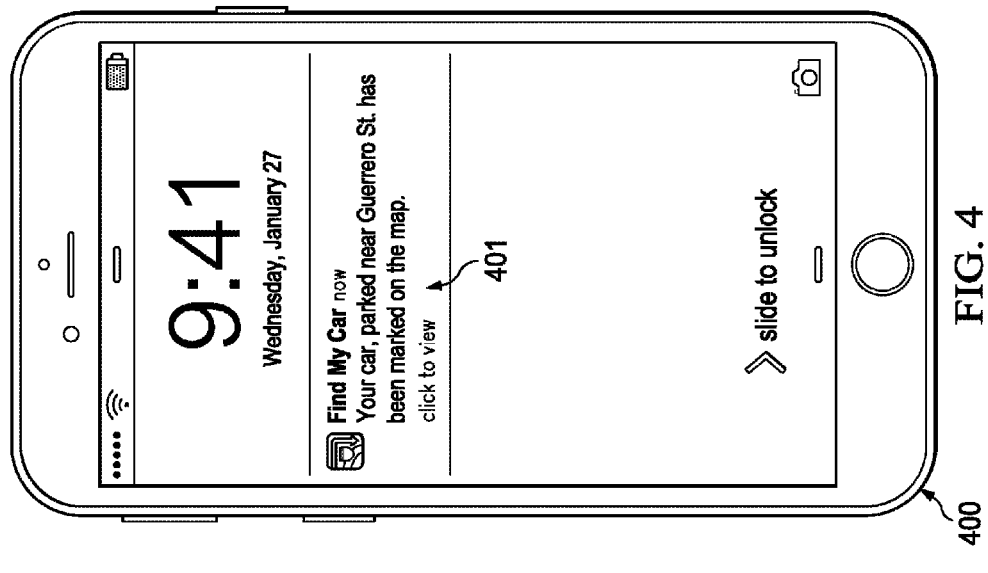
FIG. 4 is a flow diagram of an example process for parking event detection and location estimation, according to an embodiment.

FIG. 4 is a screen shot of an example graphical user interface (GUI) for a vehicle parking application, according to an embodiment. FIG. 4 shows mobile device 400 presenting a parked vehicle notification 401 above a "lock screen" on a display of device 400. Parked vehicle notification 401 notifies a user that the parking location of their vehicle has been marked on a map and the location of the parked vehicle. In this particular example, the example notification states: "Your car, parked near Guerrero St., has been marked on the map." Other notifications of parked car status are also possible, including but not limited to an audio announcement from a virtual assistant, a sound effect or any other visual, audio or tactile notification.

Figure 5B:
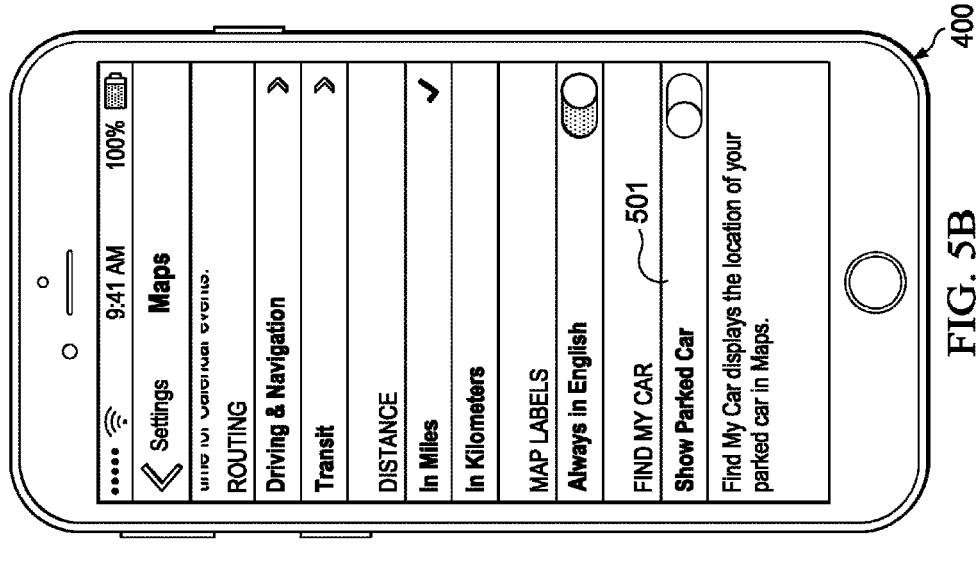
FIGS. 5A-5B are screen shots of example GUIs for a vehicle parking application, according to an embodiment.
Figure 5A:
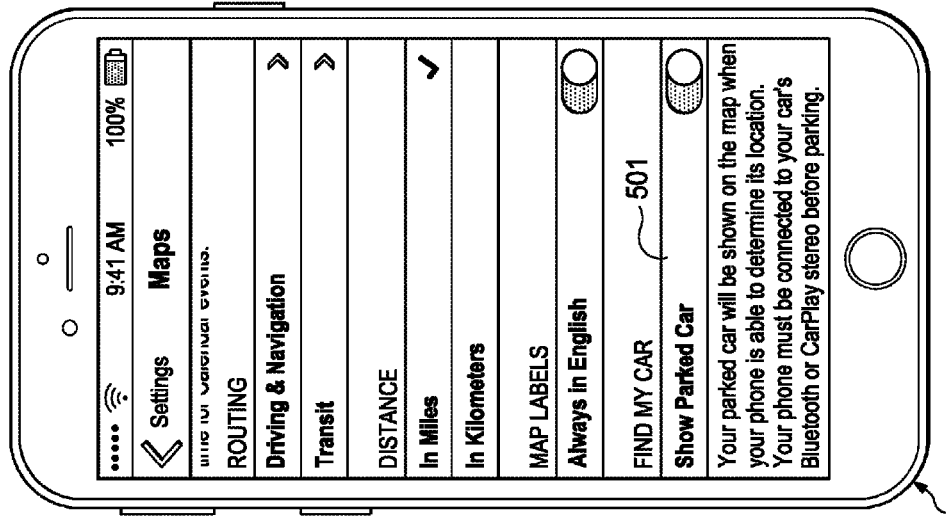

FIGS. 5A and 5B are screen shots of an example GUI for a maps application, according to an embodiment. FIGS. 5A and 5B show device 400 presenting a settings pane on a display of device 400 that includes a toggle switch 501 for turning on and off a parking application on device 400. FIG. 5A shows the parking application turned on and FIG. 5B shows the parking application turned off.

Figure 6B:
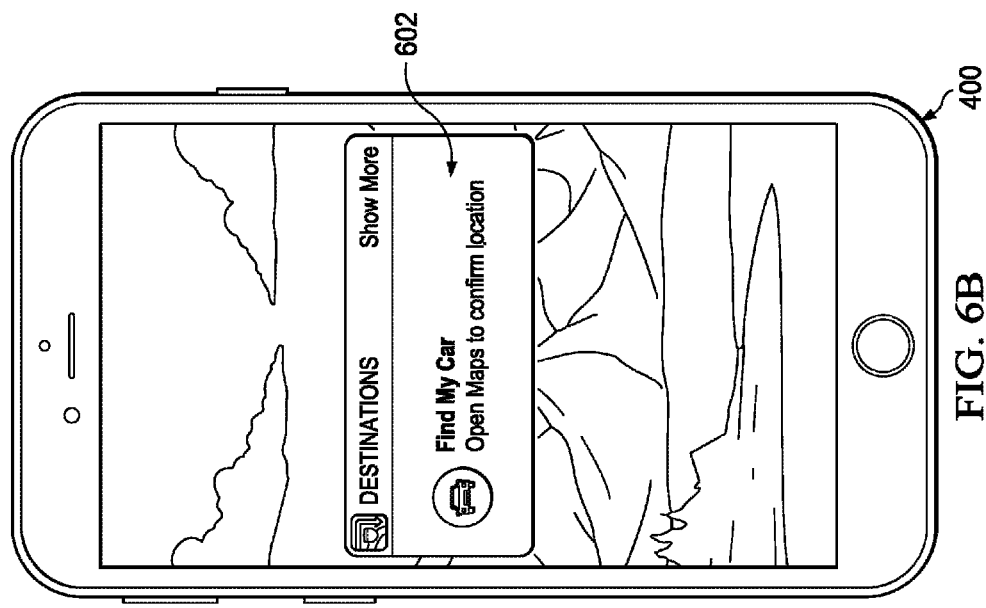
FIGS. 6A-6B are screen shots of example GUIs for a vehicle parking application, according to an embodiment.
Figure 6A:
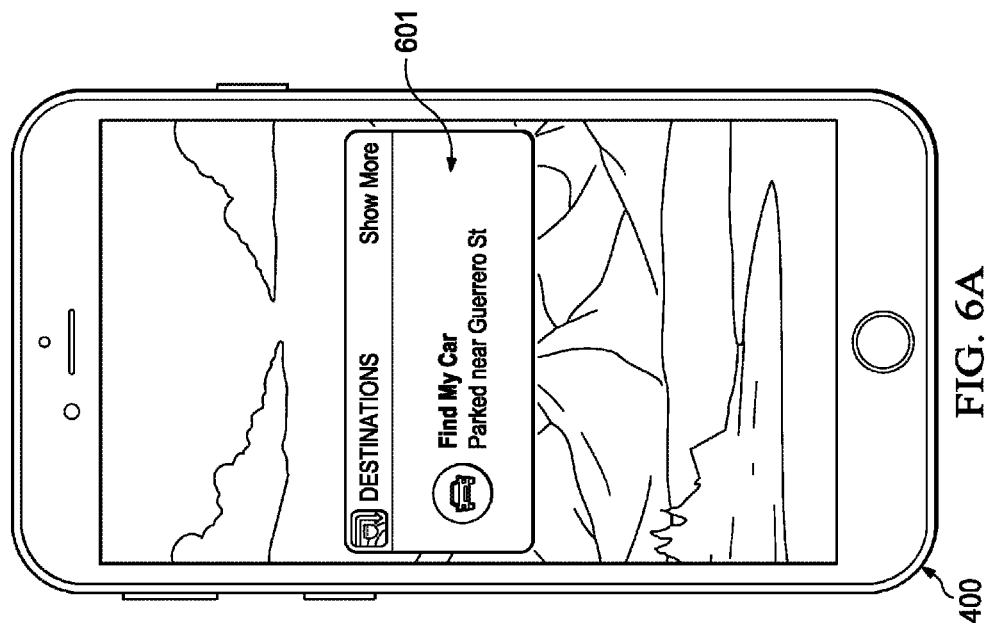

FIGS. 6A and 6B are screen shots of an example GUI provided by a maps application, according to an embodiment. FIG. 6A shows mobile device 400 presenting notification 601 on a display informing the user that the user's car is parked and its estimated location. Notification 601 is presented if there is a high confidence in the estimated parking location. Notification 602 shown in FIG. 6B informs the user that the user's car is parked but does not expose the estimated location of the user's car. Notification 602 differs from notification 601 in that notification 602 invites the user to open a maps application to confirm and/or edit the estimated location. Notification 602 can be presented to the user if there is a low confidence in the estimated parking location.

Figure 7B:
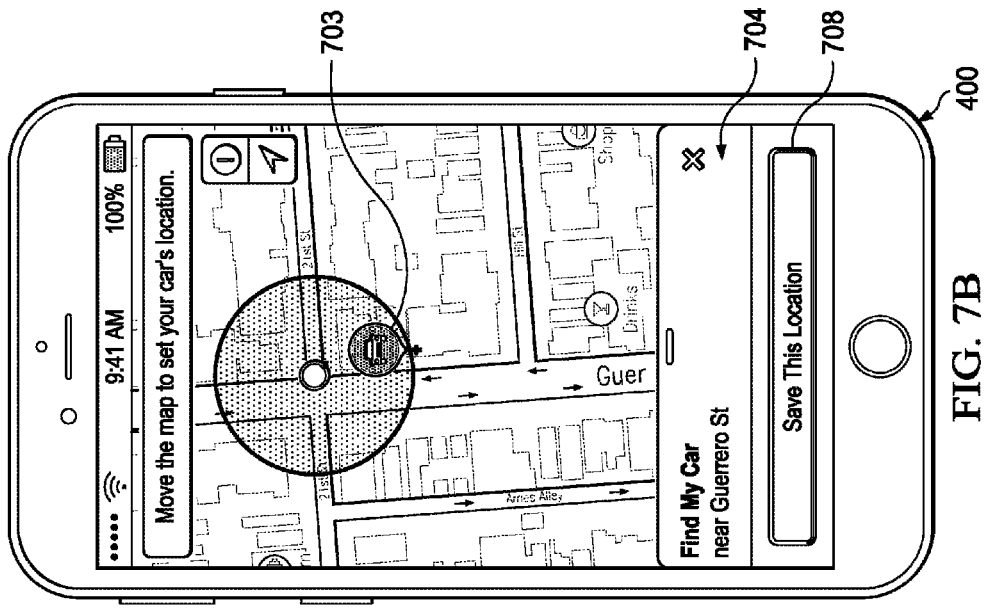
FIGS. 7A-7B are screen shots of example GUIs for a vehicle parking application, according to an embodiment.
Figure 7A:
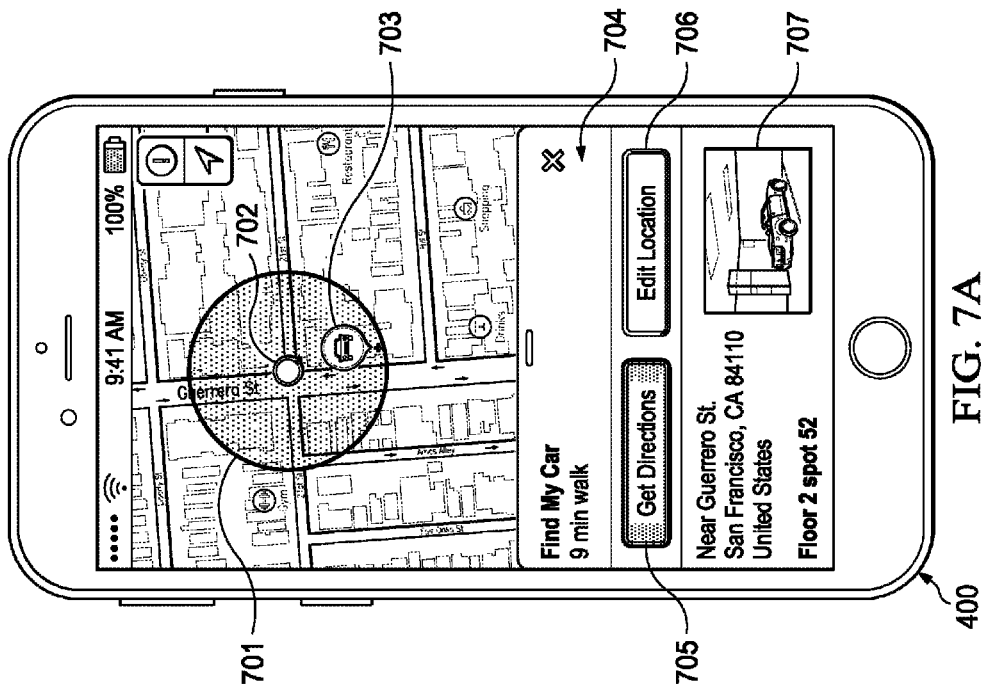

FIGS. 7A and 7B are screen shots of an example GUI provided by a maps application, according to an embodiment. FIGS. 7A and 7B show mobile device 400 presenting a maps editor on a display of device 400 for allowing a user to edit and/or augment parking event information. FIG. 7A shows parking location estimate. In an embodiment, the parking location estimate is shown by marker 703 within circle 701 having center 702. The radius of circle 701 represents the horizontal position uncertainty in the parking location estimate. The larger the radius, the larger the horizontal position uncertainty. Circle 701 represents a geographic area where the user's car may be parked but not an exact location.

Portion 704 of the GUI provides an estimated time of travel to the estimated parking location from the user's current location. Affordance 705 (e.g., a virtual button) will cause a route to be overlaid on the map. Digital image 707 shows a picture of the parking location taken by the user using a camera application on device 400. In an embodiment, when digital image 707 is available, any empty thumbnail frame is shown, which when touched by the user, invokes the camera application so that the user can take a digital image of the parking location. In an embodiment, the user may also add notes (e.g., next to the digital image) that describe the parking location. Digital image 707 of the parking location and user notes (e.g., "I'm parked at level II, section A") are useful for indoor parking garages to assist the user in finding their vehicle.

Affordance 706 (e.g., a virtual button) allows the user to edit their location. When affordance 706 is touched, the GUI of FIG. 7B is displayed. Marker 703 (or the map) can be manipulated by the user to a more precise location on the map using a touch gesture or other input (e.g., a navigation control). The appearance of marker 703 changes to indicate to the user that they have entered an editing mode. When the user is finished moving marker 703 (or the map) the user can touch affordance 709 (e.g., a virtual button) to save the edited location, as shown in FIG. 7B. Portion 704 of the GUI exposes text describing the new location.

Figure 8B:
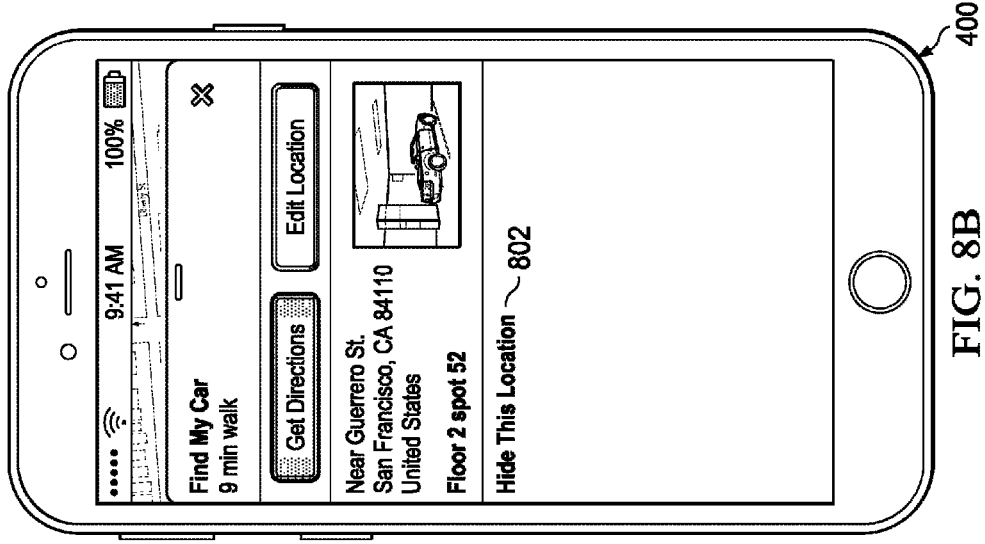
FIGS. 8A-8C are screen shots of example GUIs for a vehicle parking application, according to an embodiment.
Figure 8A:
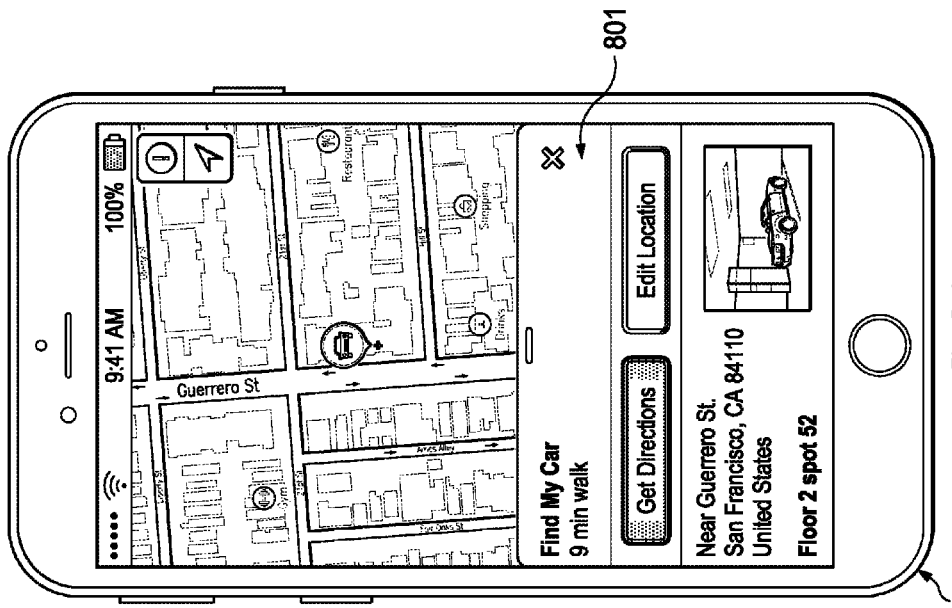
Figure 8C:
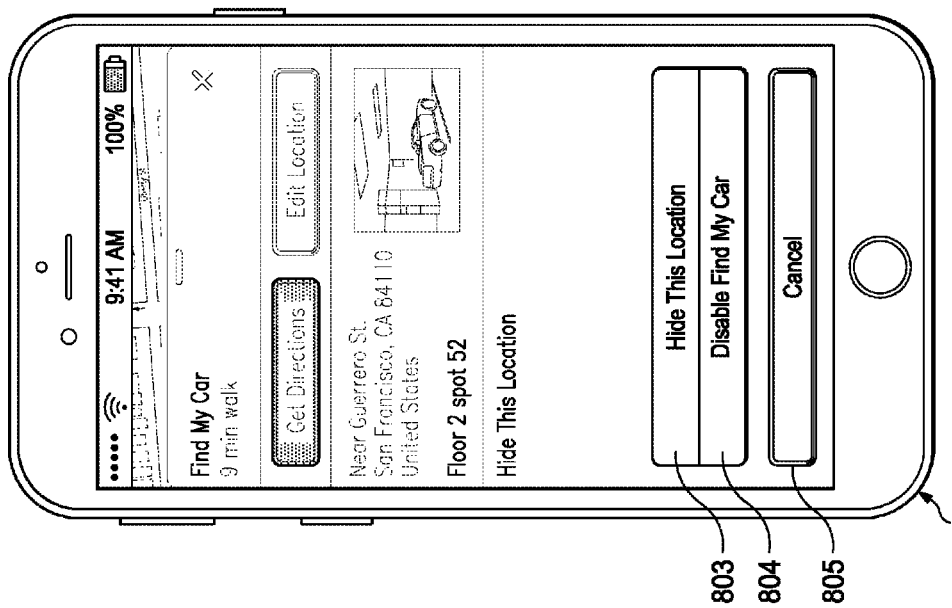

FIGS. 8A-8C are screen shots of an example GUI for a maps application, according to an embodiment. FIG. 8A illustrates a sliding pane handle 801 which can be manipulated by the user (slide upward) to reveal additional information. For example, after the sliding pane is moved upward towards the top of device 400, affordance 802 is exposed to allow the user to hide the estimated vehicle parking location by not exposing the parking location in the GUI. Affordance 802 (e.g., a link) can be touched by the user resulting in a table of cells 803-805 be displayed. Cell 803 hides the parking location of the vehicle so that it is not shown, cell 804 disables the parking application and cell 805 cancels the current operation. The GUI shown in FIGS. 8A-8C allow the user to protect their privacy and to enhance security by hiding the actual location of the user's parked vehicle in case their mobile device is lost or stolen. As used herein, the terms "hide" or "hiding" includes any method of preventing the estimated vehicle location from being viewed or otherwise perceived by a user or any other individual through any visual, audio or tactile means.

Figure 9A:
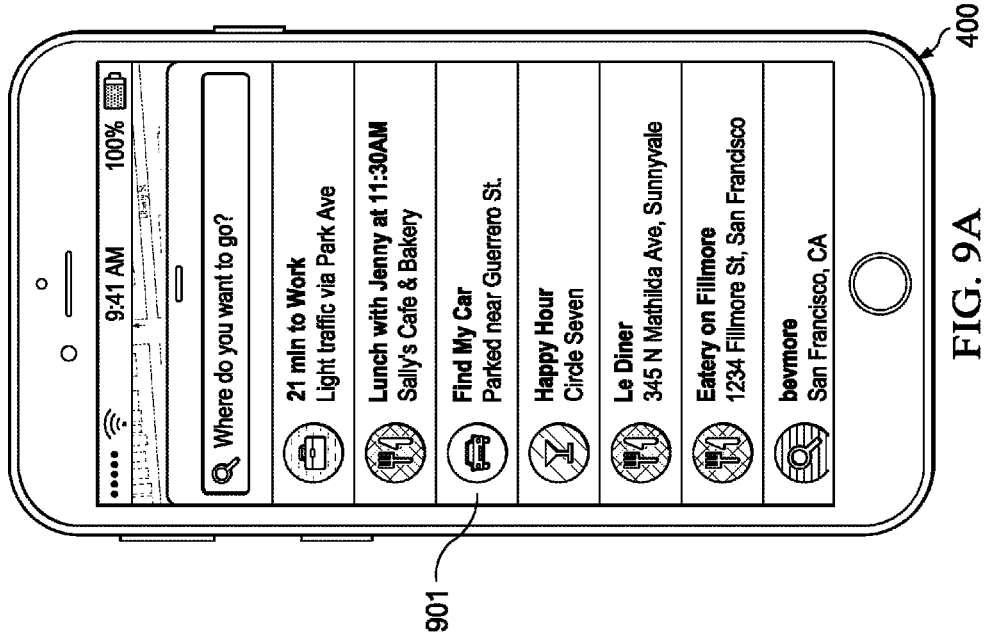
FIGS. 9A-9C are screen shots of example GUIs for a vehicle parking application, according to an embodiment.
Figure 9C:
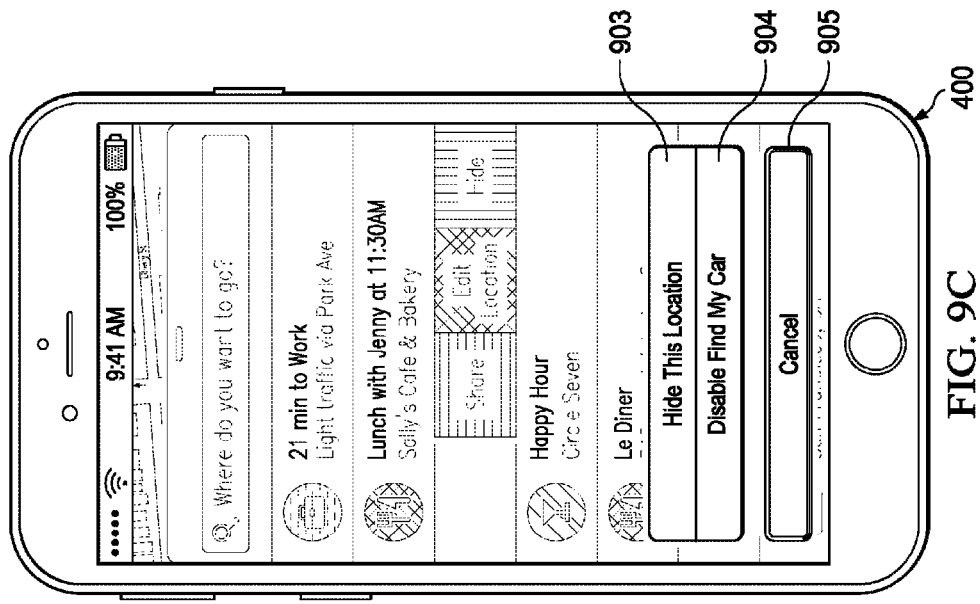
Figure 9B:
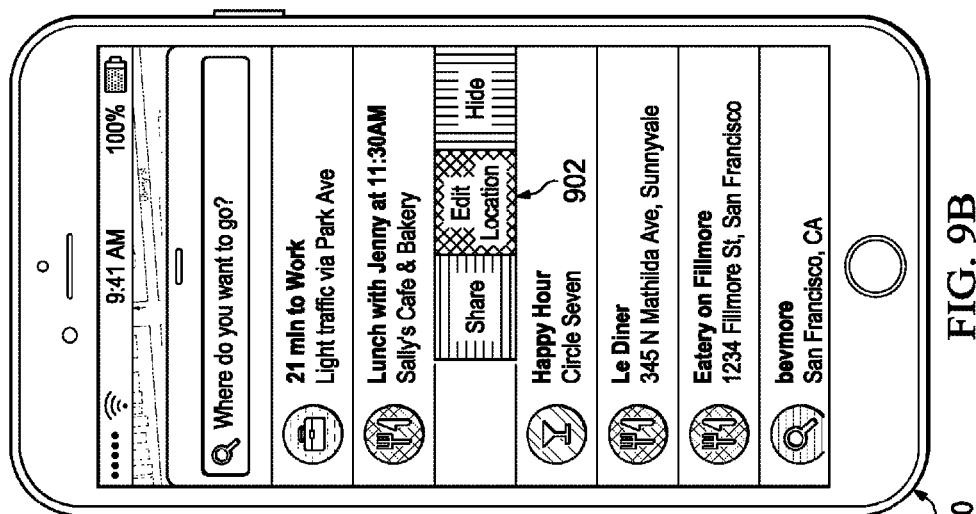

FIGS. 9A-9C are screen shots of an example GUI provided by a maps application, according to an embodiment. FIG. 9A illustrates the use of a location search field that allows the user to search for past locations. In the example shown, cell 901 represents the parking location of the user's vehicle. In an embodiment, the cells can be presented in an ordered list based on the importance of the location to the user. For example, if the system knows the user is at home and their car is parked in their garage, the location of their parked car may not be as important to the user as, for example, the user's work location.

In FIG. 9B, the user makes a swipe gesture from right to left on cell 901 which exposes options, including share the parking location, edit the parking location and hide the parking location. In this example, the user selects option 902 to edit the location of her parked vehicle and the GUI shown in FIG. 9C is displayed which includes a cell table with cells 903, 904 and 905, which allows the user to hide the location, disable the parking application or cancel the operation, respectively.

The GUIs described above are only examples and other GUIs are possible. It should be understood that a variety of affordances can be used to perform the actions described above including but not limited to: virtual switches, sliders, rotary dials, buttons, etc. The affordances can be activated by a variety of touch input and touch gestures and also by a stylus. When selected, activated or deactivated the visual appearance of the affordances can be changed or animated. In addition to or in lieu of visual affordances all of the features of the parking application described above can be implemented using voice commands and a speech recognition engine or intelligent personal assistant or knowledge navigator that can interpret the commands and convert the commands into various actions.

Example Device Architecture

Figure 10:
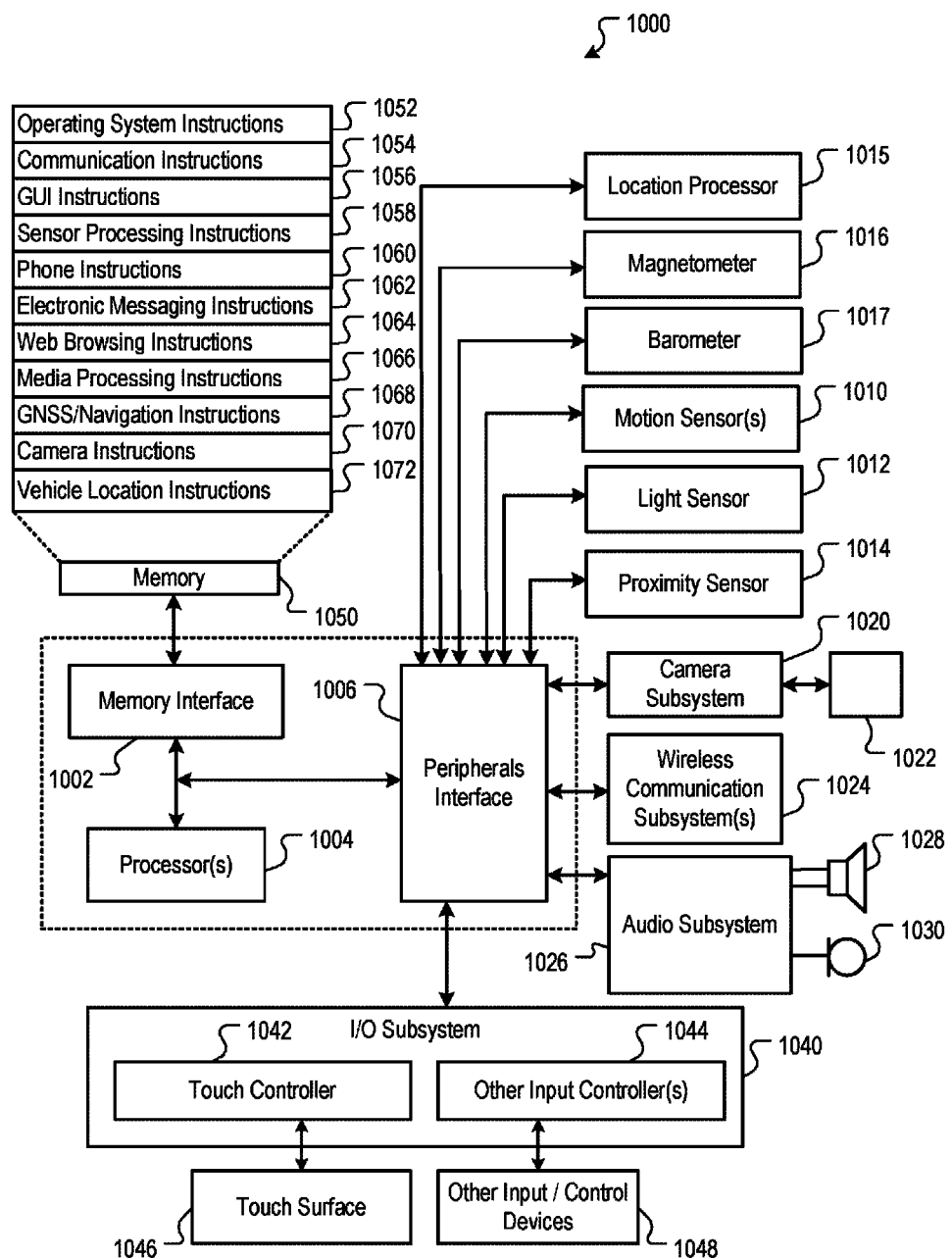
FIG. 10 is a block diagram of example device architecture for implementing the features and processes described in reference to FIGS. 1-9C.

FIG. 10 is a block diagram of example device architecture for implementing the features and processes described in reference to FIGS. 1-9. Architecture 1000 may be implemented in any mobile device for generating the features and processes described in reference to FIGS. 1-3, including but not limited to smart phones and wearable computers (e.g., smart watches, fitness bands). Architecture 1000 may include memory interface 1002, data processor(s), image processor(s) or central processing unit(s) 1004, and peripherals interface 1006. Memory interface 1002, processor(s) 1004 or peripherals interface 1006 may be separate components or may be integrated in one or more integrated circuits. One or more communication buses or signal lines may couple the various components.

Sensors, devices, and subsystems may be coupled to peripherals interface 1006 to facilitate multiple functionalities. For example, motion sensor 1010, light sensor 1012, and proximity sensor 1014 may be coupled to peripherals interface 1006 to facilitate orientation, lighting, and proximity functions of the device. For example, in some implementations, light sensor 1012 may be utilized to facilitate adjusting the brightness of touch surface 1046. In some implementations, motion sensor 1010 (e.g., an accelerometer, rate gyroscope) may be utilized to detect movement and orientation of the device. Accordingly, display objects or media may be presented according to a detected orientation (e.g., portrait or landscape).

Other sensors may also be connected to peripherals interface 1006, such as a temperature sensor, a barometer, a biometric sensor, or other sensing device, to facilitate related functionalities. For example, a biometric sensor can detect fingerprints and monitor heart rate and other fitness parameters.

Location processor 1015 (e.g., GNSS receiver chip) may be connected to peripherals interface 1006 to provide georeferencing. Electronic magnetometer 1016 (e.g., an integrated circuit chip) may also be connected to peripherals interface 1006 to provide data that may be used to determine the direction of magnetic North. Thus, electronic magnetometer 1016 may be used as an electronic compass.

Camera subsystem 1020 and an optical sensor 1022, e.g., a charged coupled device (CCD) or a complementary metal-oxide semiconductor (CMOS) optical sensor, may be utilized to facilitate camera functions, such as recording photographs and video clips.

Communication functions may be facilitated through one or more communication subsystems 1024. Communication subsystem(s) 1024 may include one or more wireless communication subsystems. Wireless communication subsystems 1024 may include radio frequency receivers and transmitters and/or optical (e.g., infrared) receivers and transmitters. Wired communication systems may include a port device, e.g., a Universal Serial Bus (USB) port or some other wired port connection that may be used to establish a wired connection to other computing devices, such as other communication devices, network access devices, a personal computer, a printer, a display screen, or other processing devices capable of receiving or transmitting data.

The specific design and implementation of the communication subsystem 1024 may depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, IEEE802.xx communication networks (e.g., Wi-Fi, Wi-Max, ZigBee™), 3G, 4G, 4G LTE, code division multiple access (CDMA) networks, near field communication (NFC), Wi-Fi Direct and a Bluetooth™ network. Wireless communication subsystems 1024 may include hosting protocols such that the device may be configured as a base station for other wireless devices. As another example, the communication subsystems may allow the device to synchronize with a host device using one or more protocols or communication technologies, such as, for example, TCP/IP protocol, HTTP protocol, UDP protocol, ICMP protocol, POP protocol, FTP protocol, IMAP protocol, DCOM protocol, DDE protocol, SOAP protocol, HTTP Live Streaming, MPEG Dash and any other known communication protocol or technology.

Audio subsystem 1026 may be coupled to a speaker 1028 and one or more microphones 1030 to facilitate voice-enabled functions, such as voice recognition, voice replication, digital recording, and telephony functions.

I/O subsystem 1040 may include touch controller 1042 and/or other input controller(s) 1044. Touch controller 1042 may be coupled to a touch surface 1046. Touch surface 1046 and touch controller 1042 may, for example, detect contact and movement or break thereof using any of a number of touch sensitivity technologies, including but not limited to, capacitive, resistive, infrared, and surface acoustic wave technologies, as well as other proximity sensor arrays or other elements for determining one or more points of contact with touch surface 1046. In one implementation, touch surface 1046 may display virtual or soft buttons and a virtual keyboard, which may be used as an input/output device by the user.

Other input controller(s) 1044 may be coupled to other input/control devices 1048, such as one or more buttons, rocker switches, thumb-wheel, infrared port, USB port, and/or a pointer device such as a stylus. The one or more buttons (not shown) may include an up/down button for volume control of speaker 1028 and/or microphone 1030.

In some implementations, device 1000 may present recorded audio and/or video files, such as MP3, AAC, and MPEG video files. In some implementations, device 1000 may include the functionality of an MP3 player and may include a pin connector for tethering to other devices. Other input/output and control devices may be used.

Memory interface 1002 may be coupled to memory 1050. Memory 1050 may include high-speed random access memory or non-volatile memory, such as one or more magnetic disk storage devices, one or more optical storage devices, or flash memory (e.g., NAND, NOR). Memory 1050 may store operating system 1052, such as Darwin, RTXC, LINUX, UNIX, OS X, iOS, WINDOWS, or an embedded operating system such as VxWorks. Operating system 1052 may include instructions for handling basic system services and for performing hardware dependent tasks. In some implementations, operating system 1052 may include a kernel (e.g., UNIX kernel).

Memory 1050 may also store communication instructions 1054 to facilitate communicating with one or more additional devices, one or more computers or servers, including peer-to-peer communications. Communication instructions 1054 may also be used to select an operational mode or communication medium for use by the device, based on a geographic location (obtained by the GPS/Navigation instructions 1068) of the device.

Memory 1050 may include graphical user interface instructions 1056 to facilitate graphic user interface processing, including a touch model for interpreting touch inputs and gestures; sensor processing instructions 1058 to facilitate sensor-related processing and functions; phone instructions 1060 to facilitate phone-related processes and functions; electronic messaging instructions 1062 to facilitate electronic-messaging related processes and functions; web browsing instructions 1064 to facilitate web browsing-related processes and functions; media processing instructions 1066 to facilitate media processing-related processes and functions; GPS/Navigation instructions 1068 to facilitate GPS and navigation-related processes and functions; camera instructions 1070 to facilitate camera-related processes and functions; and digital pedometer 1072 for providing step-based speed measurements, step count and step frequency, as described in reference to FIGS. 1-9. The GPS/Navigation instructions 1068 include instructions for implementing all or parts of system 100, including but not limited to the example fixed-point smoother disclosed herein.

Each of the above identified instructions and applications may correspond to a set of instructions for performing one or more functions described above. These instructions need not be implemented as separate software programs, procedures, or modules. Memory 1050 may include additional instructions or fewer instructions. Furthermore, various functions of the device may be implemented in hardware and/or in software, including in one or more signal processing and/or application specific integrated circuits (ASICs).

The features described may be implemented in digital electronic circuitry or in computer hardware, firmware, software, or in combinations of them. The features may be implemented in a computer program product tangibly embodied in an information carrier, e.g., in a machine-readable storage device, for execution by a programmable processor; and method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example, semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits). To provide for interaction with a user the features may be implemented on a computer having a display device such as a CRT (cathode ray tube), LED (light emitting diode) or LCD (liquid crystal display) display or monitor for displaying information to the author, a keyboard and a pointing device, such as a mouse or a trackball by which the author may provide input to the computer.

One or more features or steps of the disclosed embodiments may be implemented using an Application Programming Interface (API). An API may define one or more parameters that are passed between a calling application and other software code (e.g., an operating system, library routine, function) that provides a service, that provides data, or that performs an operation or a computation. The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API. In some implementations, an API call may report to an application the capabilities of a device running the application, such as input capability, output capability, processing capability, power capability, communications capability, etc.

As described above, some aspects of the subject matter of this specification include gathering and use of data available from various sources to improve services a mobile device can provide to a user. The present disclosure contemplates that in some instances, this gathered data may identify a particular location or an address based on device usage. Such personal information data can include location-based data, addresses, subscriber account identifiers, or other identifying information.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In the case of advertisement delivery services, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

A number of implementations have been described. Nevertheless, it will be understood that various modifications may be made. Elements of one or more implementations may be combined, deleted, modified, or supplemented to form further implementations. In yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
   determining, by a processor of a mobile device, a first activity state indicative of a possible parking event associated with a vehicle, the first activity state based on a combination of a wireless communication disconnect event between the mobile device and the vehicle and an activity estimate from an activity classifier;
   determining, by the processor, a first confidence level associated with the first activity state;
   responsive to the first confidence level being a low confidence level based on the first activity state:
   obtaining, by the processor, a speed of the mobile device from at least one of a global navigation satellite system (GNSS) receiver or wireless access point (AP) signals;
   obtaining, by the processor, pedometer data from a digital pedometer of the mobile device;
   determining, by the processor, a second activity state indicative of a possible parking event associated with the vehicle, the second activity state based at least in part on the speed obtained from at least one of the GNSS receiver or wireless AP signals, the activity estimate and the pedometer data;
   determining, by the processor, a second confidence level associated with the second activity state; and
   responsive to the second confidence level being higher than the first confidence level, estimating, by the processor, a location of the vehicle using position data obtained from at least one of the GNSS receiver or the wireless AP signals.

2. The method of claim 1, wherein determining the first activity state further comprises: detecting, by the processor, a change in state of a communication link between the mobile device and the vehicle.

3. The method of claim 1, further comprising:
   determining, by the processor, a quality level for the estimated location of the vehicle; and
   using the quality level to select a notification from a plurality of notifications related to a vehicle parking event to present on the mobile device.

4. The method of claim 3, wherein determining a quality level for the estimated location of the vehicle further comprises:
   comparing, by the processor, a probability distribution of estimated vehicle location uncertainties over a time period with a plurality of reference probability distributions of estimated vehicle location uncertainties associated with different levels of quality; and
   determining, by the processor, a reference distribution from the plurality of reference probability distributions that most closely matches the probability distribution of the estimated vehicle location uncertainties over time; and
   determining, by the processor, the quality level for the estimated location of the vehicle to be the quality level associated with the reference probability distribution that most closely matches the probability distribution of the estimated vehicle location uncertainties over time.

5. The method of claim 1, further comprising:
   determining, by the processor, that the location of the vehicle is not a designated parking location associated with the mobile device or a user of the mobile device; and
   presenting, by the mobile device, a notification including a description of the estimated vehicle location.

6. The method of claim 1, further comprising:
   responsive to first input, displaying a graphical user interface including a map and a marker on the map showing the estimated location of the vehicle.

7. The method of claim 6, wherein the marker is located in a designated area on the map, the designated area determined by a horizontal position uncertainty of the estimated vehicle location.

8. The method of claim 6, further comprising:
   responsive to second input, animating the map or the marker to move in the graphical user interface to change the location of the vehicle on the map.

9. The method of claim 6, further comprising:
   responsive to first input, generating directions from a current location of the mobile device to the estimated vehicle location.

10. The method of claim 6, further comprising:
    responsive to second input, hiding the estimated location of the vehicle so that it cannot be perceived through visual, audio or tactile means.

11. The method of claim 1, wherein estimating the location of the vehicle further comprises:
    obtaining, by the processor, GNSS data over a fixed time-interval; and
    filtering, by the processor, the GNSS data using a fixed-interval smoother.

12. The method of claim 11, wherein estimating the location of the vehicle further comprises:

comparing, by the processor, horizontal position uncertainty of the estimated location of the vehicle with a second horizontal position uncertainty corresponding to a second estimated location of the vehicle based on wireless access point signals; and selecting, by the processor, one of the estimated vehicle location or the second estimated vehicle location based on the comparing.

13. The method of claim 12, further comprising:

prior to comparing, modifying the horizontal position uncertainty and the second horizontal position uncertainty by determining time differences between a start of the possible parking event and respective timestamps of the estimated location and second estimated location, calculating products of the time differences and an average walking speed, and adding the products to the horizontal position uncertainty and second horizontal position uncertainty.

14. An apparatus comprising:

one or more processors;

memory storing instructions, which when executed by the one or more processors, cause the one or more processors to perform operations comprising:

determining a first activity state indicative of a possible parking event associated with a vehicle, the first activity state based on a combination of a wireless communication disconnect event between the apparatus and the vehicle and an activity estimate from an activity classifier;

determining a first confidence level associated with the first activity state;

responsive to the first confidence level being a low confidence level based on the first activity state:

obtaining a speed of the apparatus from at least one of a global navigation satellite system (GNSS) receiver or wireless access point (AP) signals;

obtaining pedometer data from a digital pedometer of the apparatus;

determining a second activity state indicative of a possible parking event associated with the vehicle, the second activity state based at least in part on the speed obtained from at least one of the GNSS receiver or wireless AP signals, the activity estimate and the pedometer data;

determining a second confidence level associated with the second activity state; and responsive to the second confidence level being higher than the first confidence level, estimating, by the processor, a location of the vehicle using position data obtained from at least one of the GNSS receiver or the wireless AP signals.

15. The apparatus of claim 14, wherein determining the first activity state further comprises:

detecting a change in state of a communication link between the apparatus and the vehicle.

16. The apparatus of claim 14, the operations further comprising:

determining a quality level for the estimated location of the vehicle; and using the quality level to select a notification from a plurality of notifications related to a vehicle parking event to present on the apparatus.

17. The apparatus of claim 16, wherein determining a quality level for the estimated location of the vehicle further comprises:

comparing a probability distribution of estimated vehicle location uncertainties over a time period with a plurality of reference probability distributions of estimated vehicle location uncertainties associated with different levels of quality; and determining a reference distribution from the plurality of reference probability distributions that most closely matches the probability distribution of the estimated vehicle location uncertainties over time; and determining the quality level for the estimated location of the vehicle to be the quality level associated with the reference probability distribution that most closely matches the probability distribution of the estimated vehicle location uncertainties over time.

18. The apparatus of claim 14, the operations further comprising:

determining that the location of the vehicle is not a designated parking location associated with the apparatus or a user of the apparatus; and presenting, by the apparatus, a notification including a description of the estimated vehicle location.

19. A non-transitory, computer-readable storage medium having instructions stored thereon, that when executed by one or more processors, cause the one or more processors to perform operations comprising:

determining a first activity state indicative of a possible parking event associated with a vehicle, the first activity state based on a combination of a wireless communication disconnect event between a mobile device and the vehicle and an activity estimate from an activity classifier;

determining a first confidence level associated with the first activity state;

responsive to the first confidence level being a low confidence level based on the first activity state:

obtaining a speed of the mobile device from at least one of a global navigation satellite system (GNSS) receiver or wireless access point (AP) signals;

obtaining pedometer data from a digital pedometer of the mobile device;

determining a second activity state indicative of a possible parking event associated with the vehicle, the second activity state based at least in part on the speed obtained from at least one of the GNSS receiver or wireless AP signals, the activity estimate and the pedometer data;

determining a second confidence level associated with the second activity state; and responsive to the second confidence level being higher than the first confidence level, estimating, by the processor, a location of the vehicle using position data obtained from at least one of the GNSS receiver or the wireless AP signals.

* * * * *